Patented Feb. 9, 1954

2,668,829

UNITED STATES PATENT OFFICE 2,668,829

S-(ETHYLXANTHOYL) O-(4-NITROPHENYL) O-ETHYL DITHIOPHOSPHATE

Henry Tolkmith, Midland, Mich., assignor to The Dow Chemical Company, Midland, Mich., a corporation of Delaware No Drawing. Application April 21, 1953, Serial No. 350,242

1 Claim. (Cl. 260—455)

The present invention is directed to S-(ethylxanthoyl) O-(4-nitrophenyl) O-ethyl dithiophosphate of the formula

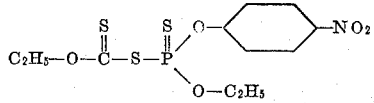

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting one molecular proportion of an alkali metal ethylate with one molecular proportion of S-(ethylxanthoyl) O-(4-nitrophenyl) dithiophosphoric chloride of the formula

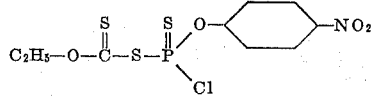

in an inert organic solvent such as benzene or diethyl ether. Of the alkali metal ethylates found useful in the reaction, it is preferred to employ the sodium compound.

In carrying out the reaction, the sodium ethylate is added with stirring to the S-(ethylxanthoyl) O-(4-nitrophenyl) dithiophosphoric chloride dispersed in the solvent and the resulting mixture heated for a period of time at a temperature of from 35° to 80° C. In practice, it is sometimes convenient to operate at the boiling temperature of the reaction mixture and under reflux. Temperatures substantially in excess of 80° C. for any appreciable period of time should be avoided, as the desired product has a tendency to decompose at such temperature. If desired, an alcoholic solution of the ethylate may be employed as a starting material. It has been found that the excess alcohol does not interfere with the course of the reaction. Upon completion of the reaction, the mixture may be filtered and the filtrate distilled under reduced pressure at gradually increasing temperatures up to a temperature of 80° C. to separate low boiling constituents and to obtain as a residue the desired S-(ethylxanthoyl) O-(4-nitrophenyl) O-ethyl dithiophosphate.

The S-(ethylxanthoyl) O-(4-nitrophenyl) dithiophosphoric chloride employed as a starting material in the above-described method may be prepared by reacting one molecular proportion of sodium 4-nitrophenolate with one molecular proportion of S-(ethylxanthoyl) dithiophosphoric dichloride in an inert organic solvent such as benzene. In carrying out the reaction, the reactants are dispersed in the solvent and the resulting mixture heated for a period of time at a temperature of from 35° to 80° C. To avoid decomposition, temperatures substantially in excess of 80° C. should not be employed. Upon completion of the reaction, the mixture may be filtered and the filtrate concentrated by distillation under reduced pressure to a temperature up to 80° C. to obtain as a residue the desired S-(ethylxanthoyl) O-(4-nitrophenyl) dithiophosphoric chloride. This compound is a viscous oil having a density of 1.4901 at 20° C. The latter compound and described method for its production constitute the subject matter of my copending application Serial No. 203,772.

In a representative preparation, an alcoholic solution of 6.8 grams (0.1 mole) of sodium ethylate in 50 milliliters of ethanol was added with stirring to 35 grams (0.1 mole) of S-(ethylxanthoyl) O-(4-nitrophenyl) dithiophosphoric chloride dispersed in 300 milliliters of diethyl ether and the resulting mixture heated for 6 hours at the boiling temperature and under reflux. At the end of this period, the reaction mixture was filtered and the filtrate concentrated by distillation under reduced pressure to a temperature up to 80° C. to obtain as a residue the desired S-(ethylxanthoyl) O-(4-nitrophenyl) O-ethyl dithiophosphate product. The latter is a viscous oil having a density of 1.3654 at 20° C. and a refractive index $n/D$ of 1.5587 at 25° C.

The new S-(ethylxanthoyl) O-(4-nitrophenyl) O-ethyl dithiophosphate product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture. In illustrative operations against representative plant pests, 100 percent kills of two-spotted spider mites, bean aphids and Mexican bean beetles were obtained with aqueous spray compositions containing 0.12, 0.5 and 0.12 pound, respectively, of the toxic dithiophosphate per 100 gallons of spray mixture.

This is a continuation in part of my copending application Serial No. 203,772, filed December 30, 1950.

I claim:

S-(ethylxanthoyl) O-(4-nitrophenyl) O-ethyl dithiophosphate.

HENRY TOLKMITH.

No references cited.